3,434,190
INDEXABLE CUTTER BLADE
Karl B. Kaiser, Rockford, Ill., assignor to The Ingersoll Milling Machine Company, Rockford, Ill., a corporation of Illinois
Filed Nov. 23, 1966, Ser. No. 596,529
Int. Cl. B26d *1/00, 1/12;* B23p *15/28*
U.S. Cl. 29—95                                                         4 Claims

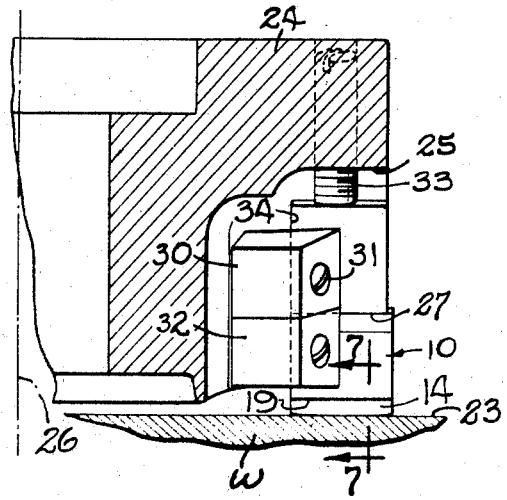
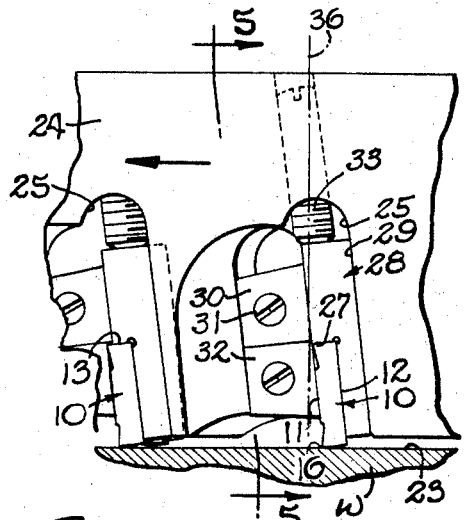
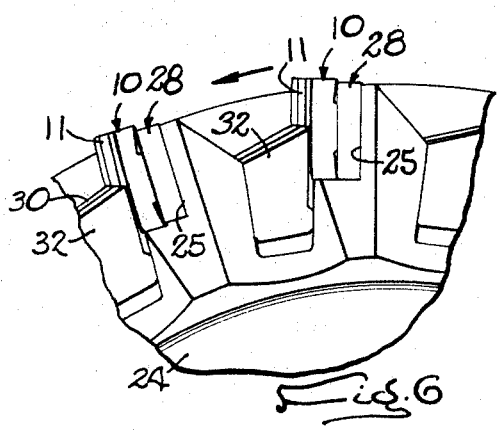
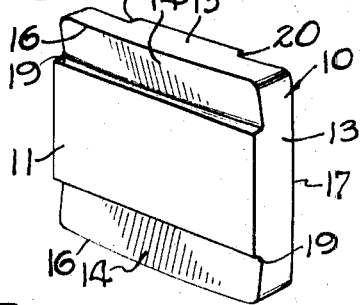
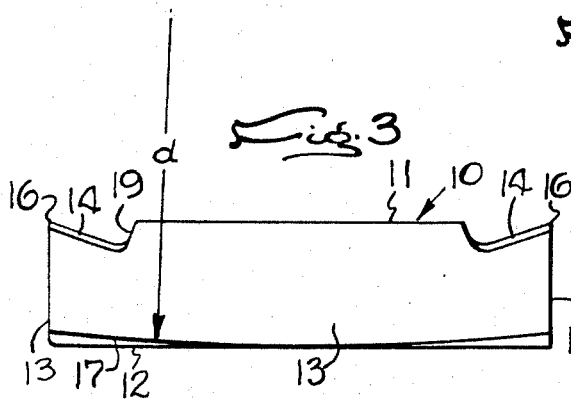
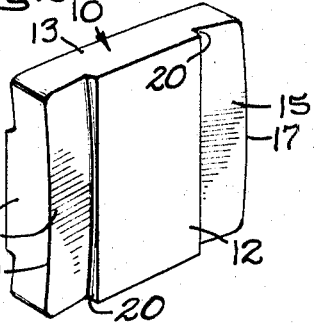

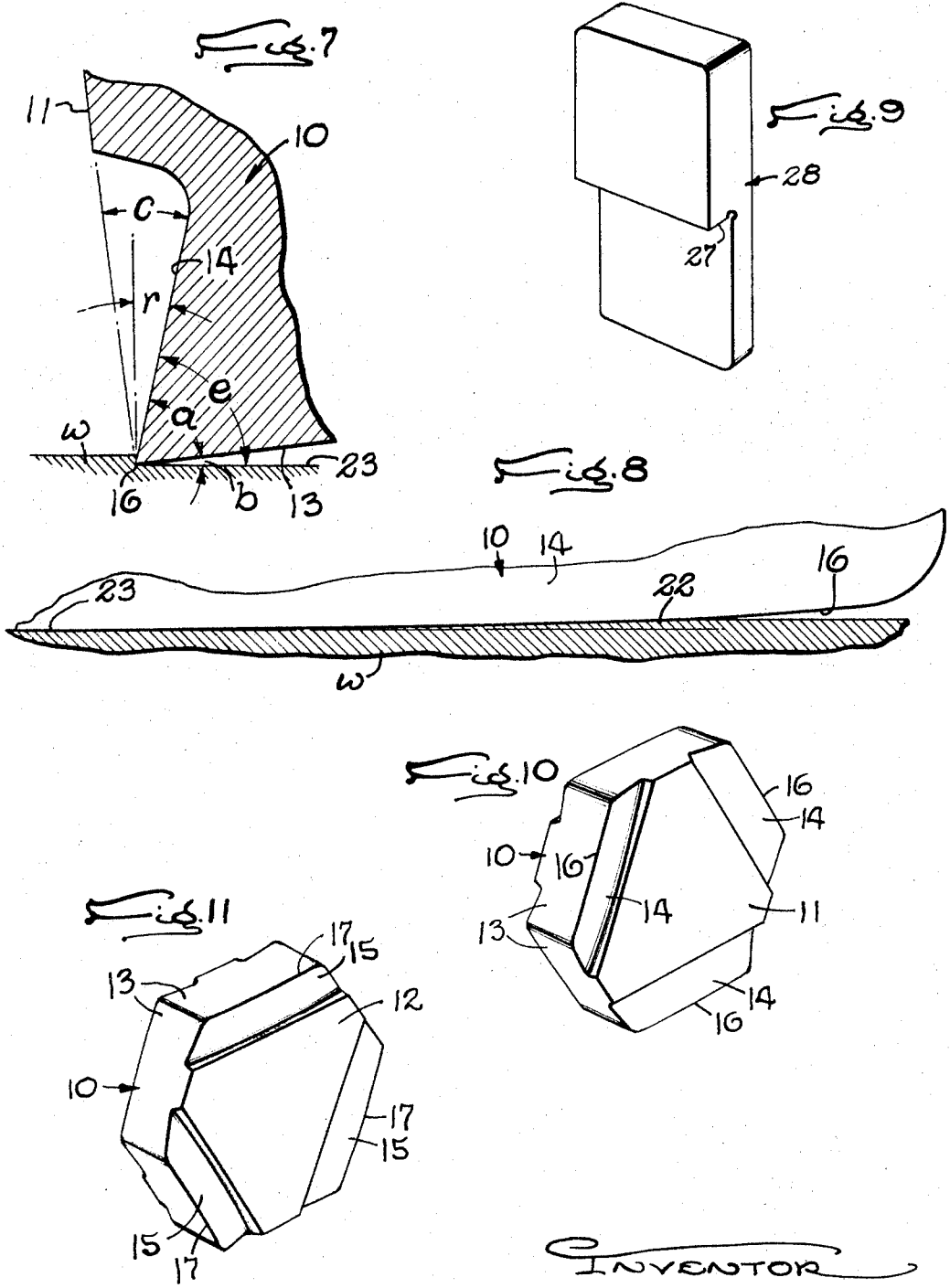

ABSTRACT OF THE DISCLOSURE

A flat wafer of cutting material in the form of an equilateral polygon is formed on one side face along alternate edges thereof with undercut narrow grooves, there being similar narrow grooves undercut in the opposite side of the wafer along the full lengths of the alternate edges of the polygon intervening between the first grooves. The bottom of each of said grooves constitutes a cutting face which is part of a cylinder having a radius several times the width of the side faces of the wafer, each cutting face being disposed relative to the edge of the wafer at an included angle of less than a right angle.

---

This invention relates to a blade for mounting in the body of an inserted blade cutter which is especially adapted for use in finish milling, boring or turning operations, the blade comprising a relatively flat wafer in the form of a polygon having duplicated cutting edges formed along the edge faces thereof and adapted to be brought selectively into cutting position on a cutter body by indexing the wafer about its axis.

The primary object is to provide an indexable blade of the above character having the following characteristics:

(a) A cutting edge along the full length of each edge of the polygonal wafer.

(b) A clearance face for each cutting edge which is disposed perpendicular to the plane of the wafer, and (c) A cutting face for each cutting edge which is disposed at a rake angle may be of any desired positive value.

Another object is to achieve the foregoing by employing a wafer having an even number of edges and staggering the cutting edges so that adjacent edges around the polygon are disposed on opposite sides of the wafer.

Other objects and advantages of the invention will become apparent from the following detailed description taken in connection with the accompanying drawings, in which FIGURES 1 and 2 are perspective views looking toward opposite sides of the indexable blade constituting the present invention.

FIG. 3 is an edge view of the blade.

FIG. 4 is a fragmentary side view of a face milling cutter equipped with the improved blade.

FIG. 5 is a fragmentary section taken along the line 5—5 of FIG. 4.

FIG. 6 is a fragmentary bottom view of the cutter.

FIGS. 7 and 8 are enlarged fragmentary sectional views of a blade and work section illustrating the cutting action.

FIG. 9 is a perspective of a part of the blade mounting.

FIGS. 10 and 11 are views similar to FIGS. 1 and 2 showing a modified form of the blade.

The improved indexable blade incorporating the present invention comprises generally a relatively thin and flat block or wafer 10 of cutting material in the form of an equilateral polygon having opposite parallel side faces 11 and 12 disposed perpendicular to edge faces 13, the latter faces intersecting with cutting faces 14 and 15 to define cutting edges 16 and 17 along the edges of the wafer. There is an even number of the cutting edges, four (FIGS. 1 and 2) when the polygon is square and six (FIGS. 10 and 11) when a hexagonal wafer is used.

In accordance with the present invention, each cutting face 14 or 15 is disposed relative to its coacting clearance face 13 at an included angle $a$ (FIG. 7) substantially less than a right angle so that when the blade is mounted on a cutter body to provide the desired cutting clearance $b$ across the edge face 13, the cutting face 14 will be positioned to act on the work with positive rake $r$. To this end, each cutting face is the bottom of a narrow groove 19 or 20 cut along an edge of the polygon over the full length thereof and opening edgewise and outwardly. The groove bottom slopes inwardly and away from the plane of the wafer face 11 or 12 at an angle $c$ which is equal to the sum of the desired values of the clearance angle $b$ and the positive rake angle $r$.

To enable the cutting edges and their cutting faces to be equal in length while leaving areas of the side faces 11, 12 for clamping the blade in a cutter body, the grooves 19 and the cutting edges 16 are formed on one side 11 of the wafer along alternate edges around the latter. Similarly the grooves 20 are cut in the opposite side face 12 but along the other edges of the wafer, the adjacent cutting edges around the wafer thus being disposed on opposite sides of the wafer but staggered or alternating relative to each other.

In the case of a square blade as shown in FIGS. 1 to 6, the grooves 19 are disposed on the side face 11 along opposite edges thereof and thus leave between them an area 11ª of the face which is rectangular and extends across the full width of the wafer between the other edges of this face. A rectangular and flat area 12ª of similar length is left on the opposite side face 12 between the grooves 20, this area extending crosswise of the flat area 11ª. Thus, in spite of the grooving of the wafer edges, the side faces 11 and 12 provide clamping areas which extend over the full length of both transverse dimensions of the wafer. As a result the latter may be made of minimum size and at minimum cost for cutting edges of a desired length. For this same reason, the blade may be made of minimum thickness necessary to achieve the desired resistance to bending thus further contributing to its low cost.

Indexable blades constructed as above described may be adapted for fine finish machining operations by curving the cutting faces 14, 15 convexly and along the cutting edges. Preferably, each cutting face is part of a cylinder of a relatively large radius $d$ (FIG. 3) so that the cutting edge 16 resulting from the intersection of the cutting face and its clearance face 13 is part of the long side of a shallow ellipse as illustrated in FIG. 8. Thus the edge 16, in moving broadwise through a workpiece $w$ in face milling or boring, is adapted to remove an extremely thin chip 22 which tapers along the edge and to the center of the blade so gradually as to leave an extremely accurate and flat finished surface 23 on the workpiece.

To form a face milling cutter, the blades constructed as above described may be mounted and clamped for indexing in a rotary body 24 in various ways including that shown in FIGS. 4 to 6. Thus the blades may be disposed in slots 25 angularly spaced around and opening radially at the periphery and axially at one end of the body adapted for rotation about a center axis 26 in the direction indicated by the arrows in FIGS. 4 and 6. Herein, each blade is seated in a nest formed by a ledge 27 on one side of a block 28 disposed in one of the body slots 25. The block is clamped against the trailing wall 29 of the slot by a wedge 30 actuated by a screw 31. The blade, with one edge 13 resting on the ledge, is clamped against the wall 29 of the nest by a similar second screw actuated clamp 32. The endwise position of the block is determined by abutment with the end of a screw 33 threaded into the body 24 and projecting into the slot at the bottom thereof, thus locating one cutting edge of the blade axially of the body and in active cutting position below the end of the body as shown in FIG. 4. The block 28 and the blade are located radially in the body by abutment of the edge faces 13 with the inner wall 34 (FIG. 6) of the slot.

The slots are inclined downwardly and backwardly relative to a radial plane 36 so that the clearance face 13 of the active cutting edge 14 will be inclined at the desired angle relative to the plane of rotation of the cutting edge. In this position of the blade, the cutting face 14 will be disposed at an acute included angle $e$ relative to the finished work surface and thus will act on the work at an effective rake angle $r$. By forming the cutting faces at proper angles $c$ (FIG. 7), any desired combination of rake angle and clearance angles $b$ and $r$ may be achieved for each of the cutting edges in the respective indexed positions of the blades.

When the active cutting edge of any blade becomes dulled or broken, the clamp 32 is loosened and the blade rotated through a half revolution, reseated and reclamped in its nest. To bring the cutting edges 17 on the opposite side 12 of the blade into active position for engaging the work, the blade, after loosening the clamp 32 is removed from its nest and turned end for end to place the edges 17 on the leading face of the blade. With one of these edges exposed, the blade is reclamped in its nest.

The number of available cutting edges on each blade may be increased as desired by employing a wafer having a larger and even number of edge faces 13. Thus, with a wafer in the form of a hexagon as shown in FIGS. 10 and 11 and grooving each side along alternating edges, three cutting edges 16 are formed on one side and three similar edges 17 are on the other side, the adjacent faces 14 and 15 around the polygon being disposed on opposite sides of the latter. As before, the remaining areas of the side faces 11 and 12 extend to the edges of the polygon and crosswise of each other on opposite side faces thus providing ample areas for clamping the blades securely in the cutter body and enabling the blade to be made of minimum size and thickness.

I claim as my invention:

1. An indexable cutter blade comprising a substantially flat wafer of cutting material in the form of an equilateral polygon having an even number of edge faces disposed perpendicular to the plane of the wafer, narrow grooves undercut in one side face of said wafer along the alternate edges around the polygon, the remaining area of such side face being left flat and planar, similar narrow grooves undercut in the opposite side face of said wafer along the full lengths of the alternate edges of the polygon intervening between the first grooves whereby to dulicate the contour of said side faces and stagger the grooves around the respective side faces, the bottom of each of said grooves constituting the cutting face of a cutting edge defined by the intersection of such face and a clearance face formed by the corresponding edge of the polygon, and said cutting faces on the respective sides of the wafer sloping inwardly and away from said cutting edges to provide between the cutting and clearance faces of each cutting edge an included angle which is less than a right angle thus permitting each cutting edge to act on a workpiece with conventional clearance across the clearance face and positive rake across the cutting face, each of said cutting faces also being part of a cylinder having a radius several times the width of the side faces of said wafer.

2. An indexable cutter blade as defined in claim 1 in which said grooves and the cutting faces formed by the bottoms thereof extend along the full lengths of the edges of the polygon.

3. An indexable cutter blade as defined in claim 1 in which said included angle is less than a right angle by at least the amount of a clearance angle of conventional magnitude.

4. An indexable cutter blade as defined in claim 1 in which the area of each side face of said wafer between the edges of adjacent cutting edges on said face extends to the intervening edge of the polygon.

References Cited

UNITED STATES PATENTS 3,279,034   10/1966   Kaiser _____ 29—95

FOREIGN PATENTS 315,005   10/1919   Germany.
929,691   6/1963   Great Britain.

HARRISON L. HINSON, *Primary Examiner.*

U.S. Cl. X.R.

29—105; 77—58